(12) United States Patent
Veltri et al.

(10) Patent No.: US 10,378,745 B2
(45) Date of Patent: Aug. 13, 2019

(54) WALL MOUNT LIGHT FIXTURE WITH EXTERNAL SENSOR HOUSING

(71) Applicant: Hubbell Incorporated, Shelton, CT (US)

(72) Inventors: Thomas Veltri, Simpsonville, SC (US); Dhavalkumar Patel, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/966,166

(22) Filed: Apr. 30, 2018

(65) Prior Publication Data

US 2018/0320873 A1  Nov. 8, 2018

Related U.S. Application Data

(60) Provisional application No. 62/500,776, filed on May 3, 2017.

(51) Int. Cl.
| | |
|---|---|
| *F21S 8/00* | (2006.01) |
| *F21V 23/04* | (2006.01) |
| *F21V 15/015* | (2006.01) |
| *F21V 17/16* | (2006.01) |
| *G01S 7/521* | (2006.01) |
| *G01S 15/52* | (2006.01) |
| *F21V 17/00* | (2006.01) |
| *G01S 15/58* | (2006.01) |
| *F21V 3/04* | (2018.01) |

(52) U.S. Cl.
CPC .......... *F21V 23/0471* (2013.01); *F21S 8/033* (2013.01); *F21V 15/015* (2013.01); *F21V 17/00* (2013.01); *F21V 17/164* (2013.01); *F21V 23/0442* (2013.01); *G01S 7/521* (2013.01); *G01S 15/523* (2013.01); *F21V 3/049* (2013.01); *G01S 15/582* (2013.01)

(58) Field of Classification Search
None
See application file for complete search history.

(56) References Cited

U.S. PATENT DOCUMENTS

| | | |
|---|---|---|
| 2,906,863 A | 9/1959 | Ritter |
| 5,867,099 A | 2/1999 | Keeter |
| 6,215,398 B1 | 4/2001 | Platner et al. |
| 6,415,205 B1 | 7/2002 | Myron et al. |
| 7,411,489 B1 | 8/2008 | Elwell et al. |

(Continued)

OTHER PUBLICATIONS

U.S. Appl. No. 15/496,671 entitled "Wall Mount Light Fixture", filed Apr. 25, 2017.

(Continued)

*Primary Examiner* — Vip Patel
(74) *Attorney, Agent, or Firm* — Michael Best & Friedrich, LLP (57) ABSTRACT

A wall mounted light fixture includes a surface mount including a rear wall having a plurality of mounting openings, a top wall extending from the rear wall, and a bottom wall extending from the rear wall. The light fixture housing is connected to the surface mount and defines an interior portion. A light emitter is positioned in the interior portion of the housing. A lens is connected to the housing. A sensor assembly including a sensor housing and a sensor module is positioned at least partially in the sensor housing. The sensor assembly is operatively connected to the light emitter and the sensor housing is external to the light fixture housing.

20 Claims, 10 Drawing Sheets

(56) References Cited

U.S. PATENT DOCUMENTS

| | | |
|---|---|---|
| 2004/0213003 A1 | 10/2004 | Lauderdale et al. |
| 2005/0090124 A1 | 4/2005 | Mohacsi et al. |
| 2007/0229297 A1 | 10/2007 | Leonard et al. |
| 2007/0274084 A1 | 11/2007 | Kan et al. |
| 2007/0285930 A1 | 12/2007 | Chen |
| 2009/0244897 A1 | 10/2009 | Anglikowski et al. |
| 2010/0103672 A1 | 4/2010 | Thomas et al. |
| 2012/0175494 A1 | 7/2012 | Williams et al. |
| 2013/0044475 A1 | 2/2013 | Hutchens |
| 2014/0146542 A1 | 5/2014 | Seward et al. |
| 2014/0268720 A1 | 9/2014 | Dungan et al. |
| 2015/0338053 A1 | 11/2015 | Rector et al. |

OTHER PUBLICATIONS

PCT/Us2018/030099 International Search Report and Written Opinion dated Jul. 9, 2018 (11 pages).

WALL MOUNT LIGHT FIXTURE WITH EXTERNAL SENSOR HOUSING

RELATED APPLICATION(S)

This application is based on U.S. Provisional Application Ser. No. 62/500,776, filed May 3, 2017, the disclosure of which is incorporated herein by reference in its entirety and to which priority is claimed.

FIELD

Various exemplary embodiments relate to sensors for wall mounted light fixtures.

BACKGROUND

Light fixtures, or luminaires, are used with electric light sources to provide aesthetic and functional housing in both interior and exterior applications. One type of light fixture is a wall mounted light fixture. Wall mounted lighting fixtures are positioned along walls and provide lighting for a space, such as a building or room. Different users can have different design requirements based on location and desired light output.

Occupancy sensor systems are known for sensing the occupancy and the vacancy within a designated area and for activating an electrical system in response to sensing a person within the designated area. The occupancy sensor can be connected to a lighting system, ventilation system or other electrical system that is intended to be activated only when needed. The sensor device within the occupancy sensor can be an infrared system or an ultrasonic system that is capable of detecting when the designated area is occupied by a person or object. The occupancy sensor is typically mounted on a wall or ceiling in a designated area. Occupancy sensors are typically used to reduce the energy consumption for illuminating the designated area. Accordingly, occupancy sensors require reliable activation when the target area is occupied and to prevent false activation when the area is vacant.

SUMMARY

According to an exemplary embodiment, a wall mounted light fixture includes a surface mount including a rear wall having a plurality of mounting openings, a top wall extending from the rear wall, and a bottom wall extending from the rear wall. The light fixture housing is connected to the surface mount and defines an interior portion. A light emitter is positioned in the interior portion of the housing. A lens is connected to the housing. A sensor assembly including a sensor housing and a sensor module is positioned at least partially in the sensor housing. The sensor assembly is operatively connected to the light emitter and the sensor housing is external to the light fixture housing.

According to another exemplary embodiment, a light fixture sensor assembly includes a mounting bracket including a top wall having a connecting feature and a front wall extending at an oblique angle from the top wall. A sensor housing is connected to the mounting bracket. The sensor housing includes an outer wall having a sensor opening. A sensor module is positioned in the housing and has a sensor component positioned in the sensor opening. The mounting bracket is configured to be connected to the exterior of a light fixture.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
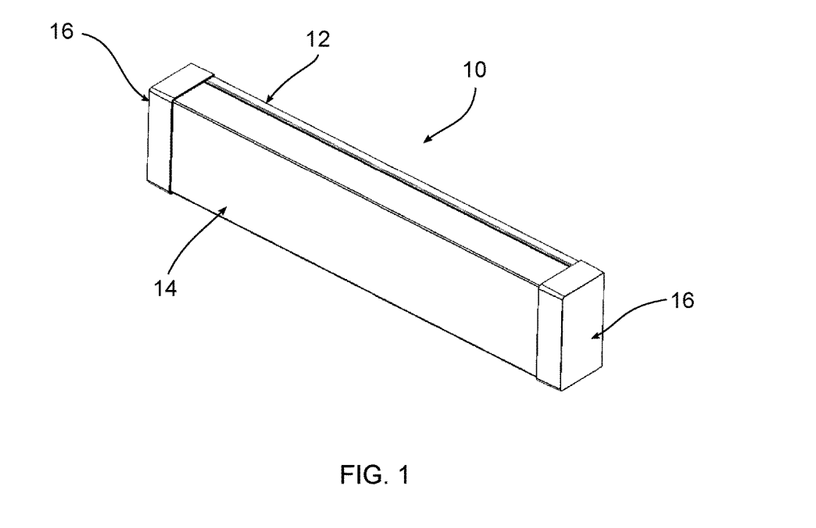
FIG. 1 is a front perspective view of an exemplary light fixture.
Figure 2:
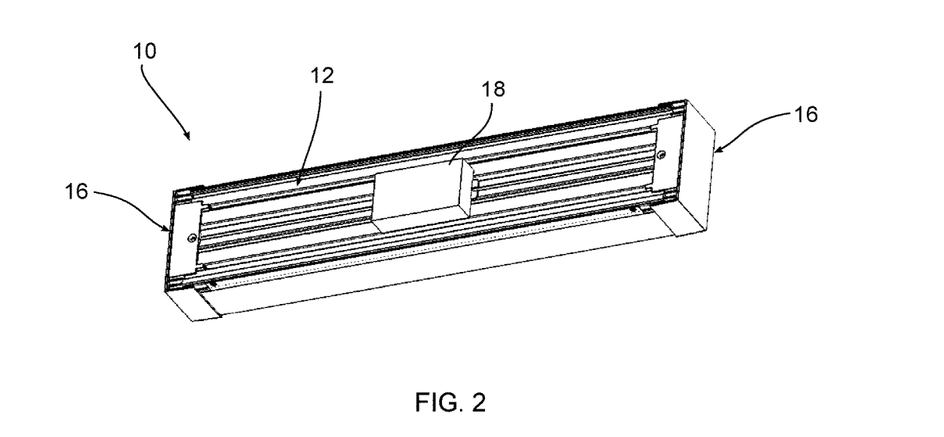
FIG. 2 is a rear perspective view of FIG. 1.
Figure 3:
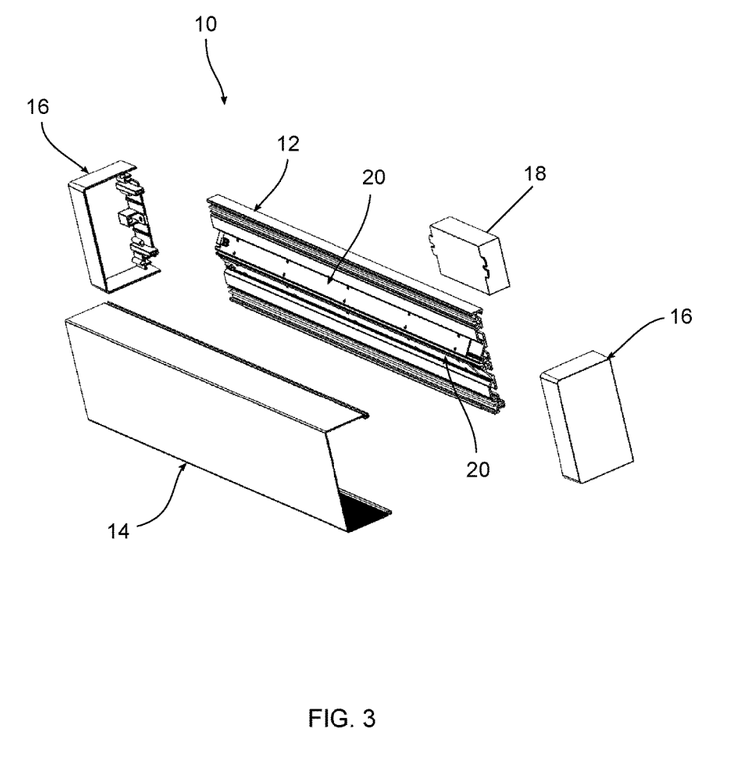
FIG. 3 is an exploded view of FIG. 1.

FIGS. 1-3 show an exemplary wall mounted light fixture 10, although the features described herein can be incorporated into other light fixtures. The light fixture 10 may be recessed or surface mounted and is electrically connected to a power source (not shown), such as a mains power supply in a building. The light fixture 10 can be positioned to direct light to a specific area of a room, for example outwardly from the wall and/or also from the top and bottom of the light fixture 10.

According to an exemplary embodiment, the light fixture 10 includes a body 12, a lens 14, and a pair of end caps 16. The lens 14 and the end caps 16 are connected to the body 12. The configuration of the lens 14 can vary to achieve a desired light output. For example, the lens 14 can have different levels of opacity and different optical features, such as serrations or prisms, to provide different light diffusion. A driver compartment 18 is connected to the rear of the body 12. One or more light emitters 20 can be connected to the body 10 to emit light through the lens 14 and the end caps 16. The light emitters 20 can include a plurality of light emitting diodes (LEDs) connected to a printed circuit board (PCB). The size, number, placement, color, and orientation of the LEDs can be varied to achieve a desired light output.

Figure 4:
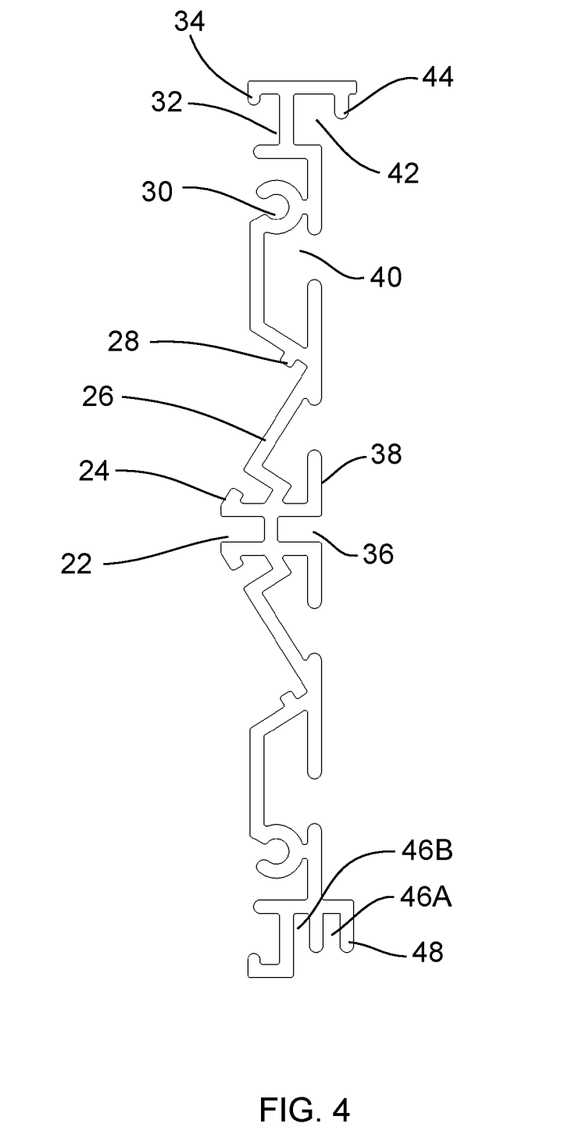
FIG. 4 is a side view of the body member of FIG. 1.
Figure 5:
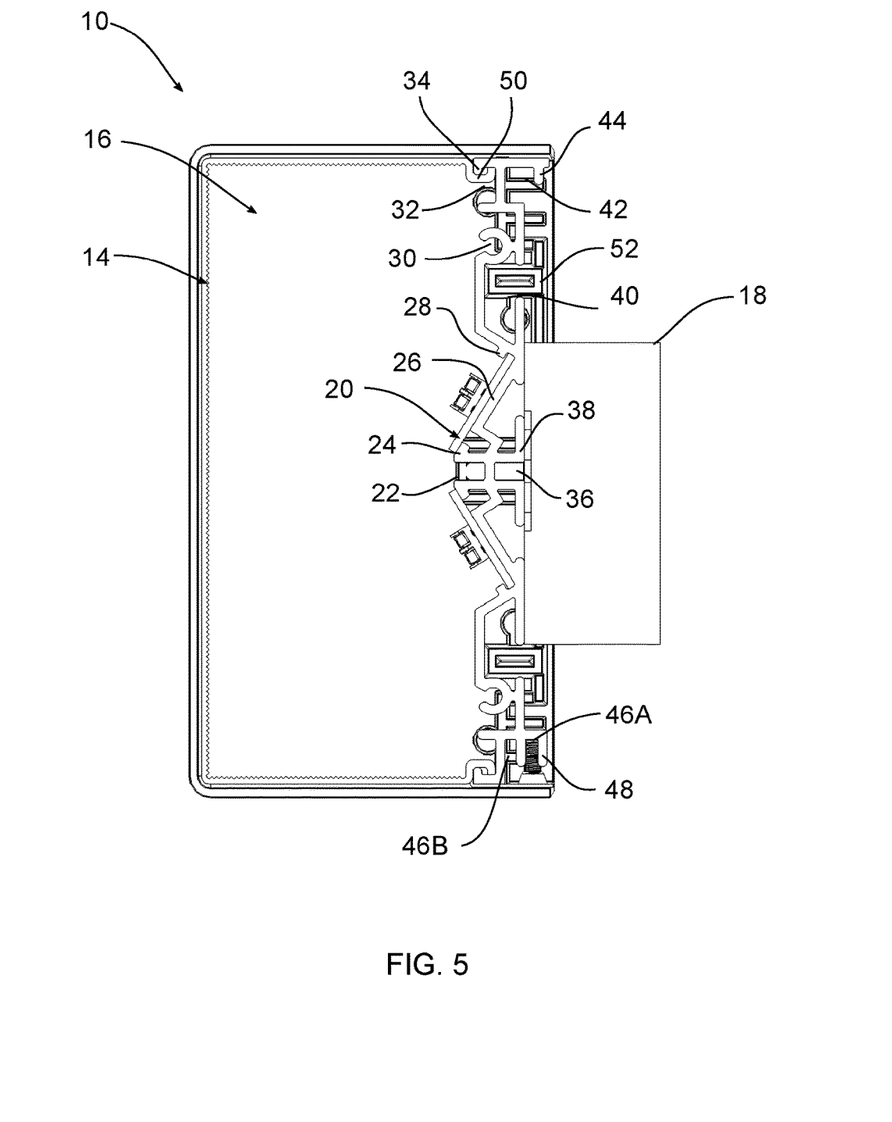
FIG. 5 is a side view of FIG. 1 with one of the end caps removed.

As best shown in FIGS. 4 and 5, the body 12 includes a plurality of connecting features to receive various components. For example, the body 12 has front connecting features including a front central channel 22 that can receive fasteners, for example screws, snap-fit connections, and interference fit connections. A set of angled front tabs 24 extend from the front channel 22 that combine with angled mounting surfaces 26 for receiving a light emitter 20. The light emitter 20 can be further held in place by mounting tabs 28. One or all of the mounting surfaces 22, 24 can receive light emitters to provide different light outputs. A cylindrical channel 30 defined by a substantially C-shaped member is provided for receiving fasteners. A front upper channel 32 is at least partially defined by a front hook member 34 that receives the lens 14. The front connecting features can be substantially symmetrical, about the center channel 22 and only the upper features are labeled in the drawings, although other configurations can also be used.

Rear connecting features can include a central rear channel 36 that receives fasteners, for example to connect the driver compartment 18. Tabs 38 extend from the rear channel 36 to provide support to the driver compartment 18. A mid rear channel 40 is positioned above the central rear channel 36. A rear upper channel 42 is at least partially defined by a rear hook member 44. An outer rear lower channel 46A is defined by a pair of arms 48 and can be configured to receive a fastener. An inner rear lower channel 46B is partially defined by one of the arms 48. Different sizes, shapes, and configurations of body members 12 can also be used depending on the size of the light fixture and the desired connection components. Different adaptor plates or brackets can also be connected to the body 12 to provide different light emitter mounting surfaces at different angles or orientations.

Figure 6:
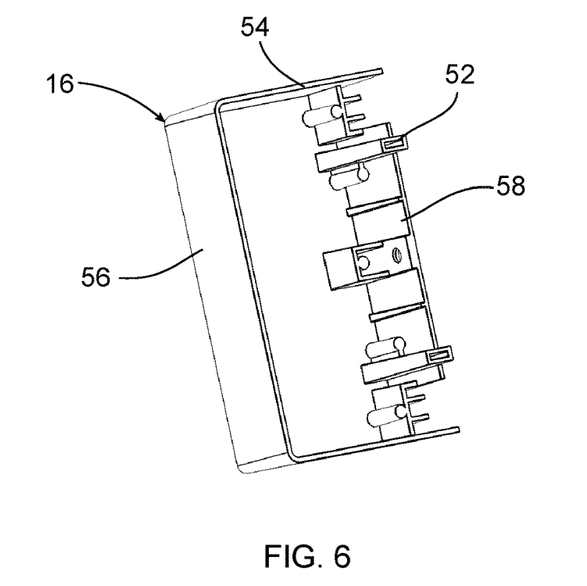
FIG. 6 is a front perspective view of the end cap of FIG. 1.
Figure 7:
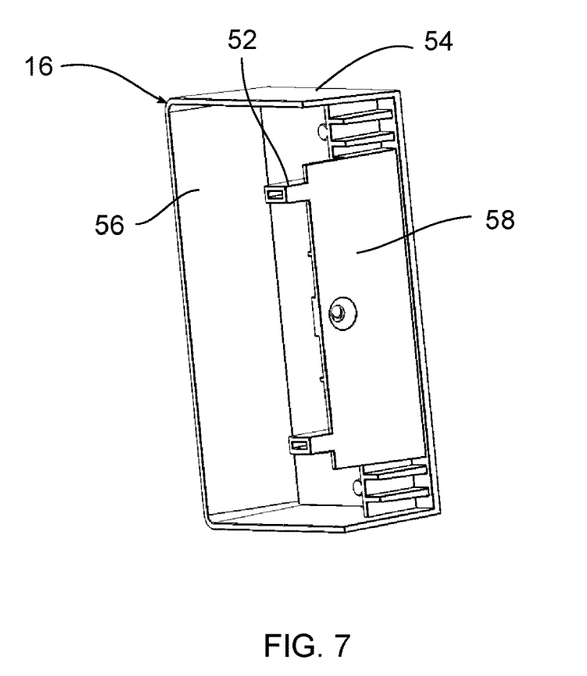
FIG. 7 is a rear perspective view of FIG. 6.

FIG. 5 shows that the lens 14 includes upper and lower lens hooks 50 that are positioned in the front upper channel 32 and connected to the front hooks 34 and that the end cap 16 includes a set of wedge protrusions 52 that extend into the rear mid channels 40. As best shown in FIGS. 6 and 7, the end cap 16 includes a side edge 54, a front edge 56, and a rear edge 58. The wedge 52 protrusions have a wider base and taper to a terminal end that forms an interference fit with the body 12. An aperture is provided in the rear edge 58 to receive a fastener that can secure the end caps 16 to the body 12. A number of other protrusions extend from the side edge 54 to help space the end cap 16 properly from the body 12.

Figure 8:
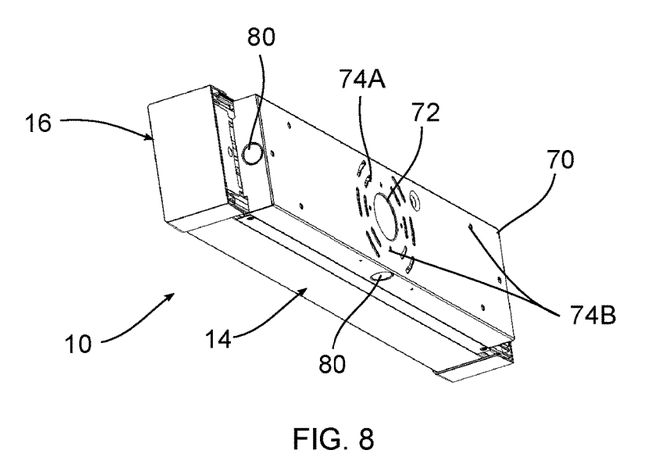
FIG. 8 is a rear perspective view of the luminaire of FIG. 1 connected to a surface mount.
Figure 9:
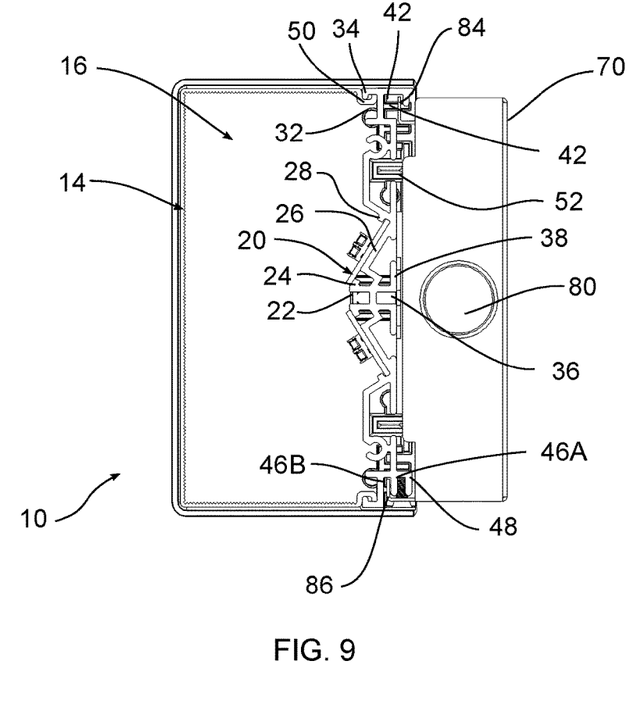
FIG. 9 is a side view of FIG. 8 with one of the end caps removed.
Figure 10:
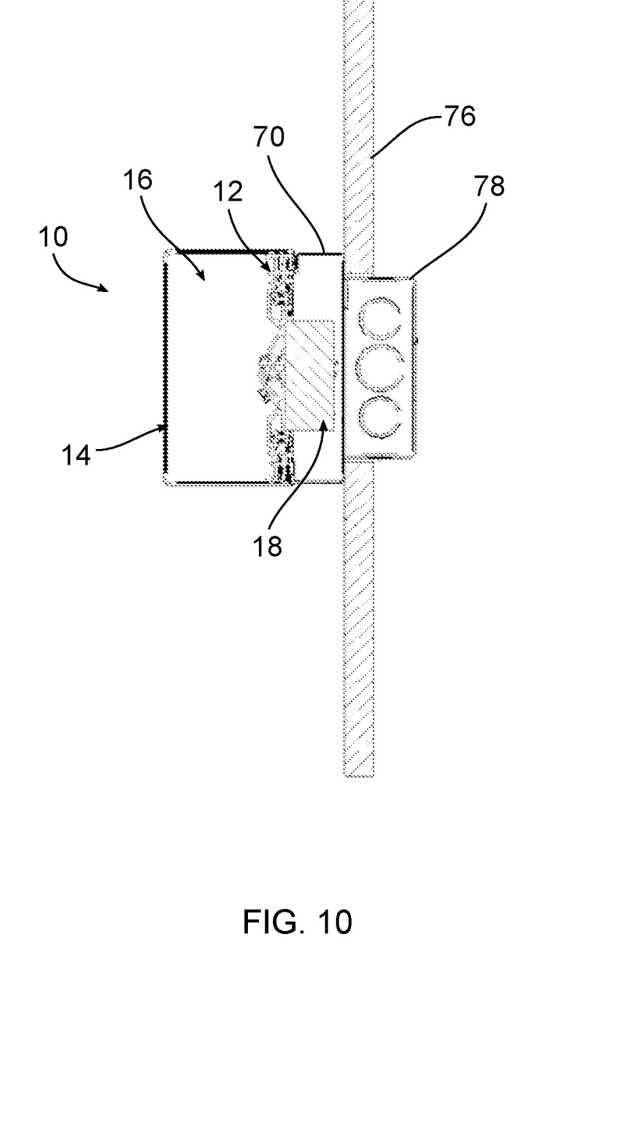
FIG. 10 is a side view of the light fixture and surface mount of FIG. 8 installed in a wall.

The light fixture 10 can be mounted to a surface, such as a wall, in a number of different ways. FIGS. 8-10 show an exemplary embodiment of a surface mount configuration. A surface mount 70 includes a rear surface with a central opening 72 that can allow conductors to be passed through the rear wall. The rear wall also includes a plurality of mounting slots 74A and mounting openings 74B that facilitate connecting the surface mount 70 to a surface 76 such as a wall or wall stud and to a junction housing 78. Knock-outs 80 are provided in side, top, and bottom walls that can be removed to provide conduits for conductors. A bottom plate 82 can be connected to the body 12 and the surface mount 70 to eliminate any gaps therebetween.

As best shown in FIGS. 9 and 10, the surface mount 70 includes a top flange 84 and a bottom flange 86. Both the top and bottom flanges 84, 86 can have a substantially L-shaped configuration with a free end facing upward. The top flange 84 extends into the rear upper channel 42. The bottom flange 86 extends into the inner rear lower channel 46B. During installation, the surface mount 70 can be connected to a surface 76, with the central opening 72 aligned with the opening of a junction box or otherwise providing access to a power supply. After the surface mount 70 is secured to the surface 76, electrical connections can be made and the body 12 can be engaged with the surface mount 70 by hanging the rear upper channel 42 and the inner rear lower channel 46B from the top flange 84 and the bottom flange 86 respectively. A fastener can then be inserted through the surface mount 70 and into the outer rear lower channel 46A. When connected, the driver compartment 18 will extend into the surface mount 70.

Figure 11:
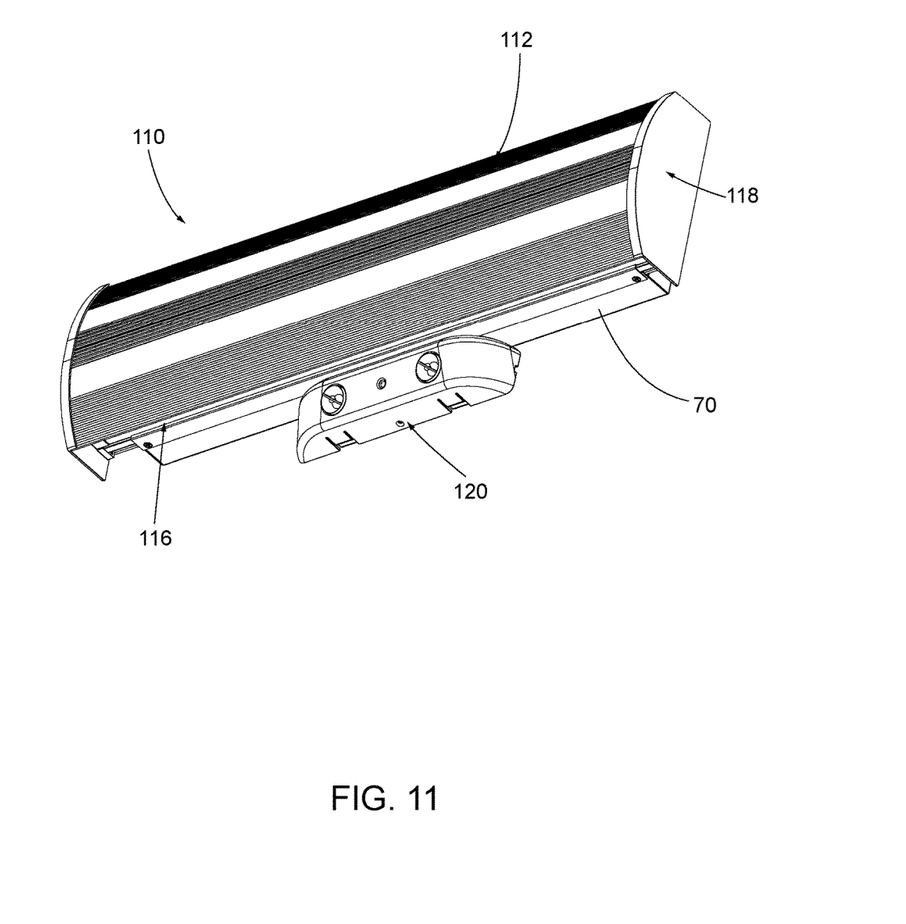
FIG. 11 is a bottom perspective view of an exemplary luminaire and a sensor assembly.

FIG. 11 shows an exemplary embodiment of a light fixture 110 that utilizes a body 12, a curved lens 112, a top lens, a bottom lens 116, and a pair of curved end caps 118. The light fixture 110 can be connected to the surface mount 70. A sensor assembly 120 is connected to the light fixture 110, for example by connecting to the surface mount 70. The sensor 120 is in communication with the light fixture, for example through the lower knockout 80 opening provided in the surface mount 70. In other exemplary embodiments, the sensor assembly 120 can be connected directly to the light fixture 110 or connected to a structural component adjacent the light fixture 110.

FIGS. 12-15 show an exemplary embodiment of the sensor assembly 120 that includes a mounting bracket 122, a housing 124, and a sensor module 126. The mounting bracket 122 is connected to the surface mount 70 and the housing 124 and the sensor module 126 are connected to the mounting bracket 122. In an exemplary embodiment, the housing 124 is configured to be snap-fit to the mounting bracket 122.

The mounting bracket 122 includes a top wall 128 that is configured to connect to the surface mount 70. The top wall 128 includes one or more connecting features, such as a first set of outer openings 130 and a set of substantially L-shaped rear slots 132. Theses connection features can receive fasteners or projections attached to the surface mount 70. In an exemplary embodiment, the L-shaped rear slots 132 can be used to releasably connect the mounting bracket 122 to the surface mount 70 by positioning a fastener in the first portion of the slot and then sliding the mounting bracket to retain the fastener in the second portion of the slot 132. A central slot 134 or other opening can be aligned with the knockout 80 to act as a wire conduit. The top wall 128 also includes first and second ears 136, including a first portion extending from the top wall at an oblique angle down and away from the bracket and a second portion extending from the first portion at an angle toward the surface mount 70.

A front wall 138 extends down from the top wall 128 away from the surface mount 70. The front wall receives the sensor module 126. One or more fasteners can be used to connect the sensor module 126 to the mounting bracket 122. A cut-out is formed in the front wall 138 to receive a portion of the sensor module 126. A lower tab 140 extends from the bottom of the front wall 138. The size, shape, and configuration of the bracket 122 can be modified depending on the sensor module 126.

Figure 15:
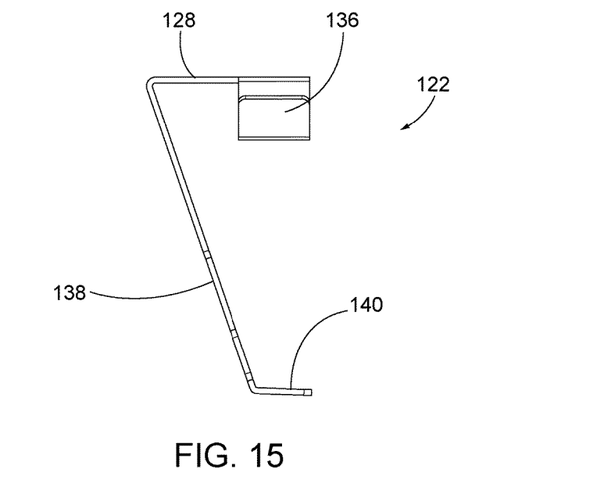
FIG. 15 is a side view of the mounting bracket.

In an exemplary embodiment, the front wall 138 extends at an acute angle to the top wall 128 away from the front of the light fixture 110. This orientation allows the sensor module 126 to have an outward and downward field of vision. This is useful for use with light fixtures 110 that have an elevated position, and the angle of the front wall 138 can be adjusted based on the desired height of the light fixture 110 and/or the location of the monitored area.

Figure 12:
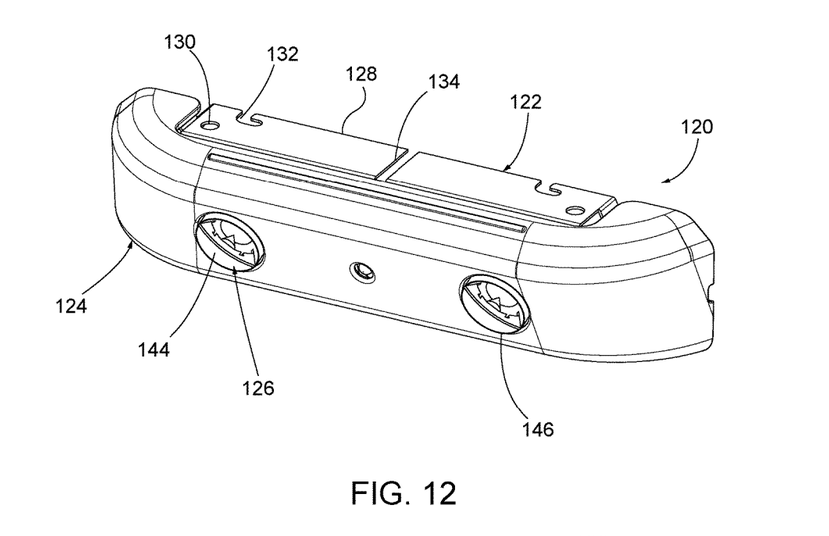
FIG. 12 is a it a top perspective view of the sensor assembly of FIG. 11.
Figure 14:
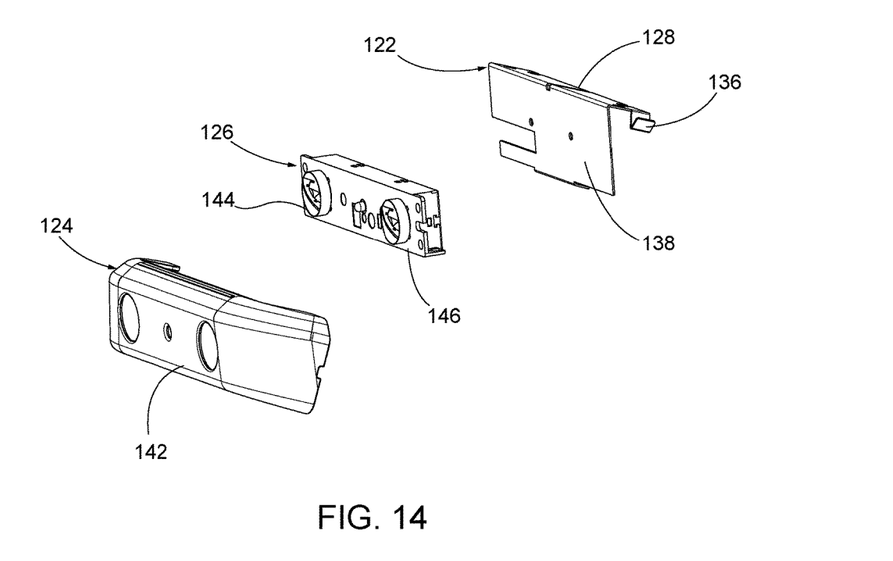
FIG. 14 is an exploded view of the sensor assembly of FIG. 11.

The housing 124 includes an outer wall 142 having one or more openings for the sensor module 126. In this embodiment the sensor module 126 is an ultrasonic sensor that uses the Doppler Effect to detect motion by shifts by pulsed sound waves. In alternative embodiment, other sensors or control components can be positioned in the housing 124. The ultrasonic sensor includes a receiver 144 and an emitter 146. The openings in the front portion 142 are sized and positioned according to the sensor components and can be modified for the use of different sensors.

Figure 13:
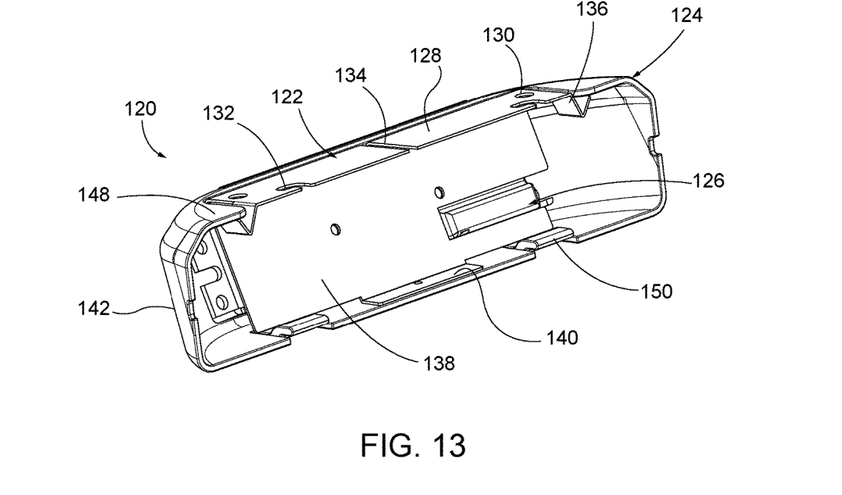
FIG. 13 is a rear perspective view of the sensor assembly of FIG. 11.

The outer wall includes curved side portions that wrap around the sensor module 126 and the mounting bracket 122. A top portion of the housing 124 includes a cutout at least partially defined by a pair of side flanges 148. The cutout receives the top wall of the mounting bracket 122 and the ears engage the side flanges. A bottom portion of the housing 124 includes a set of cantilevered tabs 150. The tabs 150 have a substantially S-shaped configuration and extend into the interior of the housing 124 to engage the front wall 138 of the mounting bracket 122. Both the ears 136 and the tabs 150 can deflect to snap-fit the housing 124 to the mounting bracket 122. If desired, a fastener can extend through the bottom portion of the housing 124 and the lower tab 140 of the mounting bracket 122 to secure the connection.

Positioning the sensor assembly 120 on the exterior of the light fixture provides a number of advantages to typical sensors positioned internally. The sensor assembly 120 can be included in a product line without having to reconfigure the interior control components of the light fixture. Exterior positioning also eliminates the need accommodate the thermal characteristics of the sensor when designing the light fixture, leading to greater flexibility. Also, the sensor housing 124 can be easily removed to allow for service and adjustment of the sensor without having to remove components of the light fixture. This can also isolate the sensor from high voltage components, which allows an unlicensed user to service or adjust the sensor.

Various exemplary embodiments are directed to methods of selecting, assembling, and manufacturing the different components described above. The use of these components provides essential base components to create an extremely varied product line. In this manner, different light fixtures can be created for different users using similar inventory components.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A wall mounted light fixture comprising:
    a surface mount including a rear wall having a plurality of mounting openings, a top wall extending from the rear wall, and a bottom wall extending from the rear wall;
    a light fixture housing connected to the surface mount, the light fixture housing defining an interior portion;
    a light emitter positioned in the interior portion of the housing;
    a lens connected to the housing; and
    a sensor assembly including a sensor housing and a sensor module positioned at least partially in the sensor housing,
    wherein the sensor assembly is operatively connected to the light emitter and the sensor housing is external to the light fixture housing.

2. The light fixture of claim 1, wherein the sensor assembly includes a mounting bracket and the sensor module is connected to the mounting bracket.

3. The light fixture of claim 2, wherein the sensor housing is snap-fit to the mounting bracket.

4. The light fixture of claim 2, wherein the mounting bracket includes a top wall, and a front wall extending from the top wall, and wherein the sensor module is connected to the front wall.

5. The light fixture of claim 1, wherein the sensor module includes an ultrasonic sensor.

6. The light fixture of claim 1, wherein the sensor assembly is connected to the bottom wall of the surface mount.

7. The light fixture of claim 1, wherein the sensor assembly is positioned below the light fixture housing.

8. The light fixture of claim 1, wherein the surface mount includes top flange and a bottom flange configured to connect to the light fixture housing.

9. The light fixture of claim 1, wherein the light fixture housing includes a body member having a first side facing the interior of the housing and a second side facing an exterior of the housing, the first side of the body having a plurality of front connecting features and the second side of the body having a plurality of rear connecting features, and wherein the light emitter is supported by the body member.

10. A light fixture sensor assembly comprising:
    a mounting bracket including a top wall having a connecting feature and a front wall extending at an oblique angle from the top wall;
    a sensor housing connected to the mounting bracket, wherein the sensor housing includes an outer wall having a sensor opening; and
    a sensor module positioned in the housing and having a sensor component positioned in the sensor opening,
    wherein the mounting bracket is configured to be connected to the exterior of a light fixture.

11. The light fixture sensor assembly of claim 10, wherein the mounting bracket includes a tab extending from the front wall opposite the top wall.

12. The light fixture sensor assembly of claim 10, wherein the connecting feature includes a set of L-shaped slots.

13. The light fixture sensor assembly of claim 10, wherein the top wall includes a central slot.

14. The light fixture sensor assembly of claim 10, wherein the top wall includes a V-shaped ear engaging the sensor housing.

15. The light fixture sensor assembly of claim 10, wherein the front wall extends at an acute angle to the top wall.

16. The light fixture sensor assembly of claim 10, wherein the sensor module is connected to the mounting bracket.

17. The light fixture sensor assembly of claim 10, wherein the sensor module includes an ultrasonic sensor.

18. The light fixture sensor assembly of claim 10, wherein the sensor module includes a receiver and an emitter.

19. The light fixture sensor assembly of claim 10, wherein the sensor housing is snap-fit to the mounting bracket.

20. The light fixture sensor assembly of claim 10, wherein the sensor housing includes a cantilevered tab engaging the mounting bracket.

* * * * *